(12) United States Patent
Garraffa

(10) Patent No.: US 7,188,869 B2
(45) Date of Patent: Mar. 13, 2007

(54) SCUBA REGULATOR CONNECTOR USING A SEALED BALL SWIVEL

(76) Inventor: Dean R. Garraffa, 17842 Georgetown La., Huntington Beach, CA (US) 92647

( * ) Notice: Subject to any disclaimer, the term of this patent is extended or adjusted under 35 U.S.C. 154(b) by 318 days.

(21) Appl. No.: 10/786,717

(22) Filed: Feb. 24, 2004

(65) Prior Publication Data

US 2005/0186022 A1 Aug. 25, 2005

(51) Int. Cl.
*F16L 27/04* (2006.01)
*A62B 9/04* (2006.01)

(52) U.S. Cl. ............... 285/261; 285/263; 285/271; 128/202.27; 128/204.26

(58) Field of Classification Search ........... 285/261, 285/263, 271, 146.1; 128/202.27, 204.26, 128/201.27, 201.28, 912
See application file for complete search history.

(56) References Cited

U.S. PATENT DOCUMENTS

| | | | | | |
|---|---|---|---|---|---|
| 937,533 | A | * | 10/1909 | Kelly et al. ............... | 285/94 |
| 1,268,259 | A | * | 6/1918 | Martin ..................... | 285/271 |
| 1,345,334 | A | * | 6/1920 | Stafford ................... | 285/271 |
| 1,346,523 | A | * | 7/1920 | Bard ....................... | 285/271 |
| 1,347,470 | A | * | 7/1920 | Bard ....................... | 285/271 |
| 1,519,110 | A | * | 12/1924 | Brownell .................. | 285/111 |
| 1,563,161 | A | * | 11/1925 | Christenson .............. | 285/111 |
| 1,733,457 | A | * | 10/1929 | Hannahs ................... | 285/94 |
| 1,917,070 | A | * | 7/1933 | Shreeve .................... | 285/94 |
| 3,454,288 | A | * | 7/1969 | Mancusi, Jr. ............. | 285/98 |
| 3,658,126 | A | * | 4/1972 | Bohlmann et al. ......... | 285/114 |
| 3,931,992 | A | * | 1/1976 | Coel ........................ | 285/30 |
| 3,944,263 | A | * | 3/1976 | Arnold ..................... | 285/96 |
| 3,951,418 | A | * | 4/1976 | Dryer ....................... | 277/619 |
| 4,081,115 | A | * | 3/1978 | White et al. ............... | 224/200 |
| 4,236,738 | A | * | 12/1980 | Poot ......................... | 285/263 |
| 5,127,681 | A | * | 7/1992 | Thelen et al. ............. | 285/121.7 |
| 5,180,194 | A | * | 1/1993 | Allread et al. ............. | 285/263 |
| 5,213,095 | A | * | 5/1993 | Dague ...................... | 128/204.18 |
| 5,259,375 | A | * | 11/1993 | Schuler .................... | 128/205.24 |
| 5,288,110 | A | * | 2/1994 | Allread .................... | 285/146.1 |
| 5,507,534 | A | * | 4/1996 | Reifenberger et al. .... | 285/122.1 |
| 5,975,490 | A | * | 11/1999 | Essman ..................... | 251/149.4 |
| 5,975,588 | A | * | 11/1999 | Hesseln et al. ............ | 285/89 |
| 6,454,313 | B1 | * | 9/2002 | Dawson et al. ............ | 285/261 |
| 6,470,887 | B1 | * | 10/2002 | Martinez ................... | 128/207.11 |
| 6,520,178 | B1 | * | 2/2003 | Baker ....................... | 128/202.27 |
| 6,746,056 | B2 | * | 6/2004 | Palmer ...................... | 285/261 |
| 2005/0205694 | A1 | * | 9/2005 | Li ............................. | 239/587.4 |

* cited by examiner

*Primary Examiner*—James M. Hewitt
(74) *Attorney, Agent, or Firm*—Leonard Tachner

(57) ABSTRACT

A ball and socket-type swivel connector for use with second stage regulators used by scuba divers. The ball is made from a metal with good corrosion resistance. The ball is then held into a true position by two separate low friction bushings. The two bushings, "sandwich" the metal swivel ball with light assembly pressure. This is accomplished by machining or molding the same radius of the swivel ball into one side of each of the two low friction bushings. As system pressure increases, the ball is forced rearwards and the squeeze increases. No seawater can enter the swivel. No area exists for seawater to collect around the O-ring. The bushing occupies all of the available space except for the gap provided around the O-ring gland an area used to hold lubrication. The preferred embodiment uses a high grade stainless steel swivel ball, virgin Teflon bushing material and an internally lubricated low friction O-ring. A wiper ring boot, a ball and socket wiper that utilizes an outer boot as a wiper ring to keep sand and contamination out of the rotational mechanism of the comfort swivel.

8 Claims, 4 Drawing Sheets

SCUBA REGULATOR CONNECTOR USING A SEALED BALL SWIVEL

BACKGROUND OF THE INVENTION

1. Field of the Invention

A ball and socket-type swivel connector for use with second stage regulators used by scuba divers. The ball is then held into a true position by two separate low friction bushings. The two bushings, "sandwich" the swivel ball with light assembly pressure. This is accomplished by machining or molding the same radius of the swivel ball into one side of each of the two low friction bushings. As system pressure increases, the ball is forced rearwards and the squeeze increases. No seawater can enter the swivel. The bushing occupies all of the available space except for the gap provided around the O-ring gland, an area used to hold lubrication. The preferred embodiment uses a high grade stainless steel swivel ball, virgin Teflon bushing material and an internally lubricated low friction O-ring. A wiper ring boot keeps sand and contamination out of the rotational mechanism of the swivel.

The present invention relates generally to the field of scuba diving equipment and more particularly to a ball and socket swivel connector for second stage regulators.

2. Background Art

Scuba regulators utilizing ball swivels have been available for some time. The problem with current ball swivel designs is the O-ring sealing reliability and the effects of that reliability on product safety. In prior art designs the Swivel ball is made from metal, "mostly chromed plated brass". This is a very cost-effective means to produce the ball. However, due to the effects of corrosion, the ball suffers from reliability problems. Current ball swivel designs allow seawater to leak into the O-ring sealing areas. When seawater is trapped inside the sealing area it will corrode the swivel ball. Once the swivel ball starts to corrode, the chromed surfaces degrade rapidly. The end result is the pressure sealing O-ring is often cut or abraded allowing system pressure to leak out. This is a safety concern. One could make the swivel ball from a material that will not corrode using various non-corrosive plating or machining the ball from expensive allows such as titanium. These are effective solutions, but costly.

Another problem with the prior art design is it makes no provision to contain O-ring lubrication. Once the sealing O-ring becomes dry of lubrication, the rotational metal swivel ball will tend to bind or require greater effort to rotate due to friction. In addition, the prior art design allows saltwater and fine sand to enter the system. This can scratch the metal ball and over time will degrade the O-ring. A better swivel ball sealing design is needed.

SUMMARY OF THE INVENTION

In the low-pressure ball swivel design of the present invention, the ball is made from a metal with good corrosion resistance. The ball is then held into a true position by two separate low friction bushings. The two bushings, "sandwich" the metal swivel ball with light assembly pressure. This is accomplished by machining or molding the same radius of the swivel ball into one side of each of the two low friction bushings. Thus the ball is held in position with extreme precision. The bushing could be machined or molded from many low friction plastics or internal lubricated materials.

As system pressure increases, the ball is forced rearwards and the squeeze increases. No seawater can enter the swivel. No area exists for seawater to collect around the O-ring. The bushing occupies all of the available space except for the gap provided around the O-ring gland an area used to hold lubrication.

To further add to the quality of this design, the preferred embodiment uses a high grade stainless steel swivel ball, virgin Teflon bushing material and an internally lubricated low friction O-ring.

Another feature of the inventive swivel is a wiper ring boot, a ball and socket wiper that utilizes an outer boot as a wiper ring to keep sand and contamination out of the rotational mechanism of the comfort swivel. This ball and socket has been effective in keeping the sand out and also has a provision to drain water from the pivot area.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
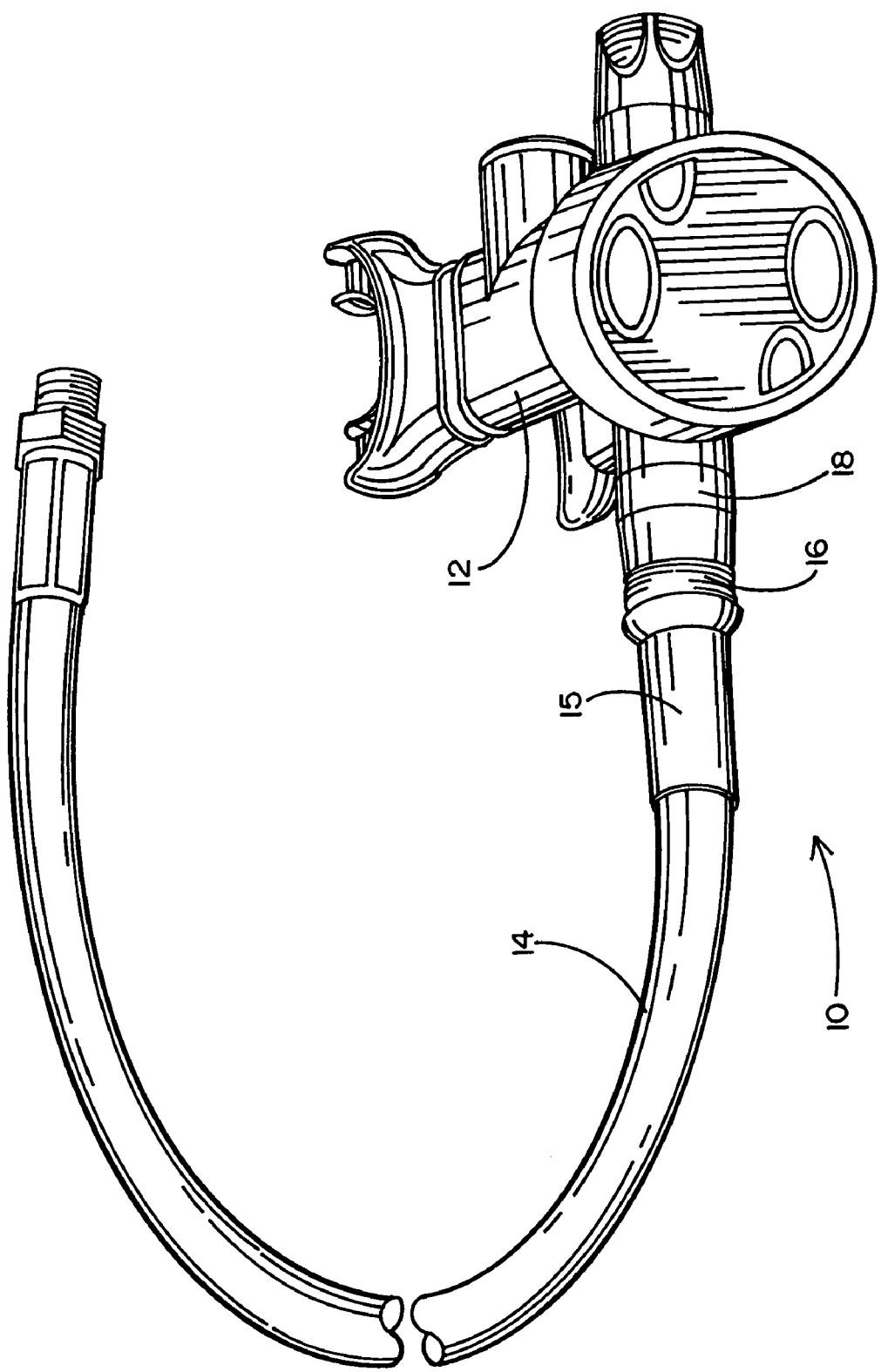
FIG. 1 is a three-dimensional drawing of a second stage scuba diving regulator and associate air hose connected to the regulator with a swivel connector according to a preferred embodiment of the invention.
Figure 2:
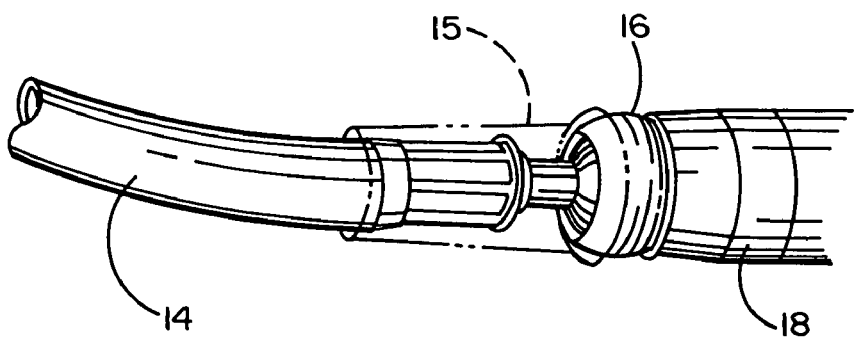
FIG. 2 is a view of the swivel connector of FIG. 1 with a protective boot in phantom to reveal the ball and socket arrangement of the connector.
Figure 3:
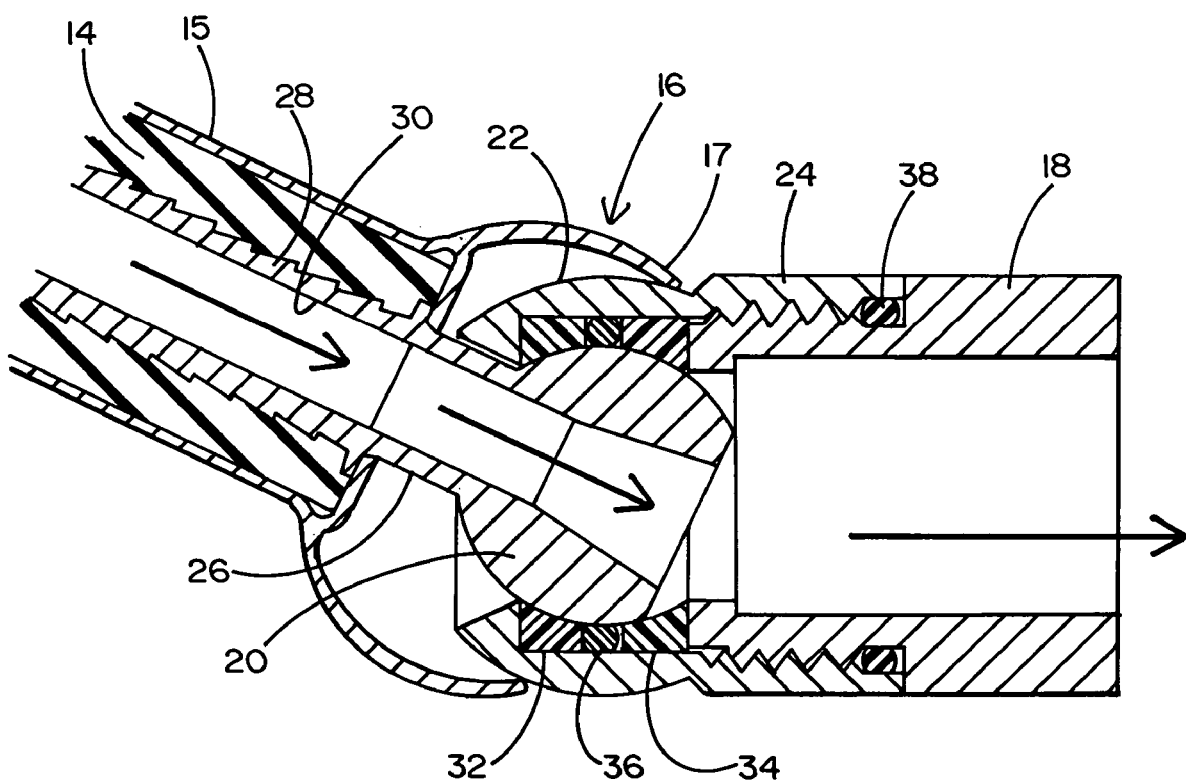
FIG. 3 is an enlarged cross-sectional view of the swivel connector of FIG. 1.
Figure 4:
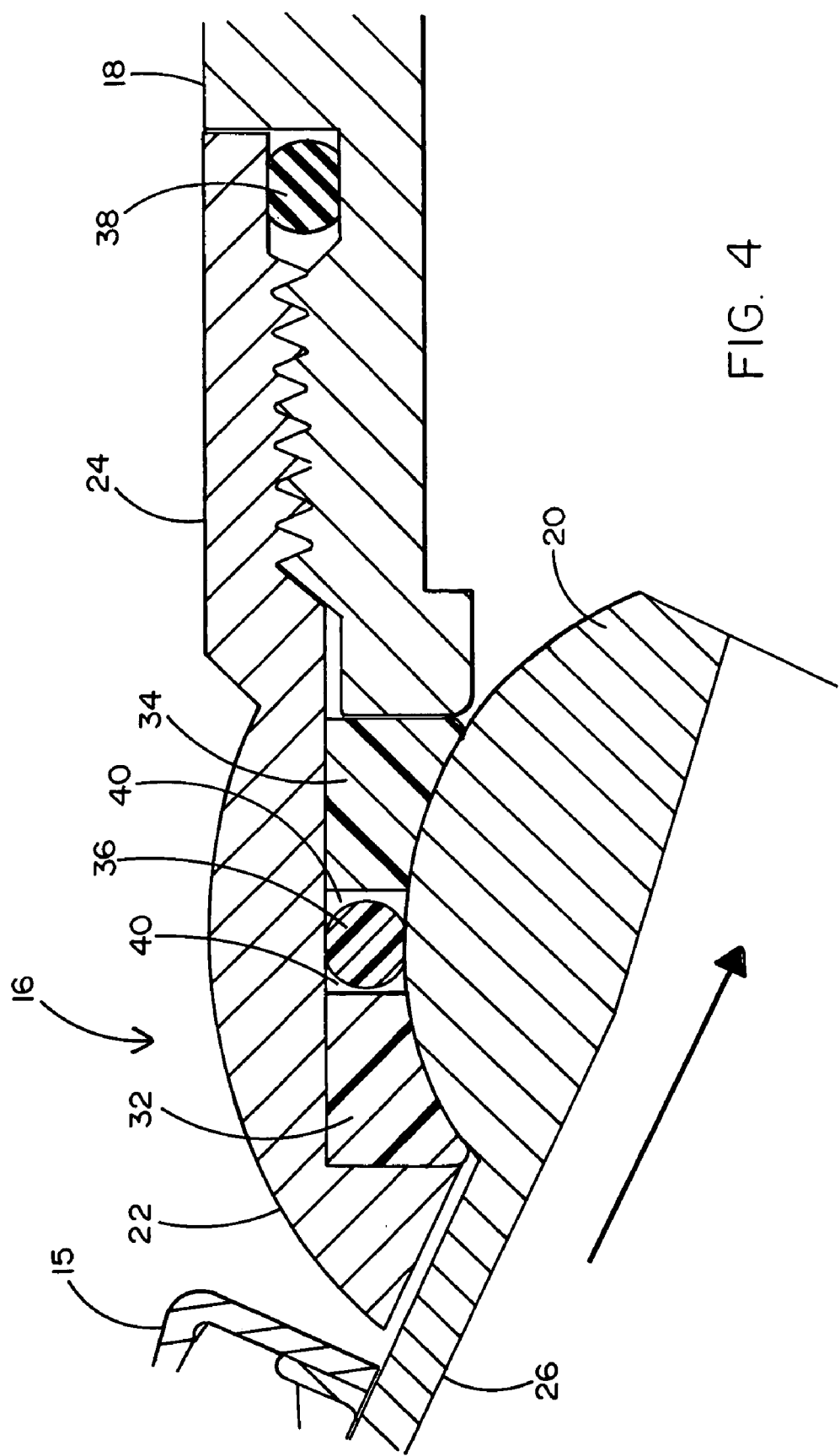
FIG. 4 is a further enlarged cross-sectional view showing the sealing arrangement under ambient conditions.

Referring to the accompanying drawings, it will be seen that the present invention is employed in conjunction with a second stage regulator assembly 10 comprising a regulator 12 and an air hose 14. The preferred embodiment of a swivel connector 16 of the present invention is disposed between the regulator 12 and hose 14 as shown in FIG. 1. A wiper ring boot 15 is disposed over the hose 14 adjacent the swivel connector 16 in a manner which aids in the reduction of contamination of the swivel connector as will be explained in detail hereinafter. The swivel connector is secured to the regulator 12 using an interface connector 18. An O-ring 38 provides a watertight seal with connector 18. The manner in which the swivel connector 16 is secured to hose 14 is understood best from FIG. 3. As seen in FIG. 3, swivel connector 16 comprises a swivel ball 20 secured in a swivel socket 22, which terminates in connector 24, the latter being threadably secured to interface connector 18. Swivel ball 20 has an integral elongated stem 26 which terminates in an anchor portion 28 within hose 14. Stem 26 and anchor portion 28 form an interior air passage 30 which extends into the air passage within hose 14. As also seen best in FIG. 3, boot 15 terminates in a bell-shaped wiper portion 17 which loosely engages socket 22 to wipe away sand and other particulate contaminants from the socket surface as the swivel is rotated during use.

Figure 5:
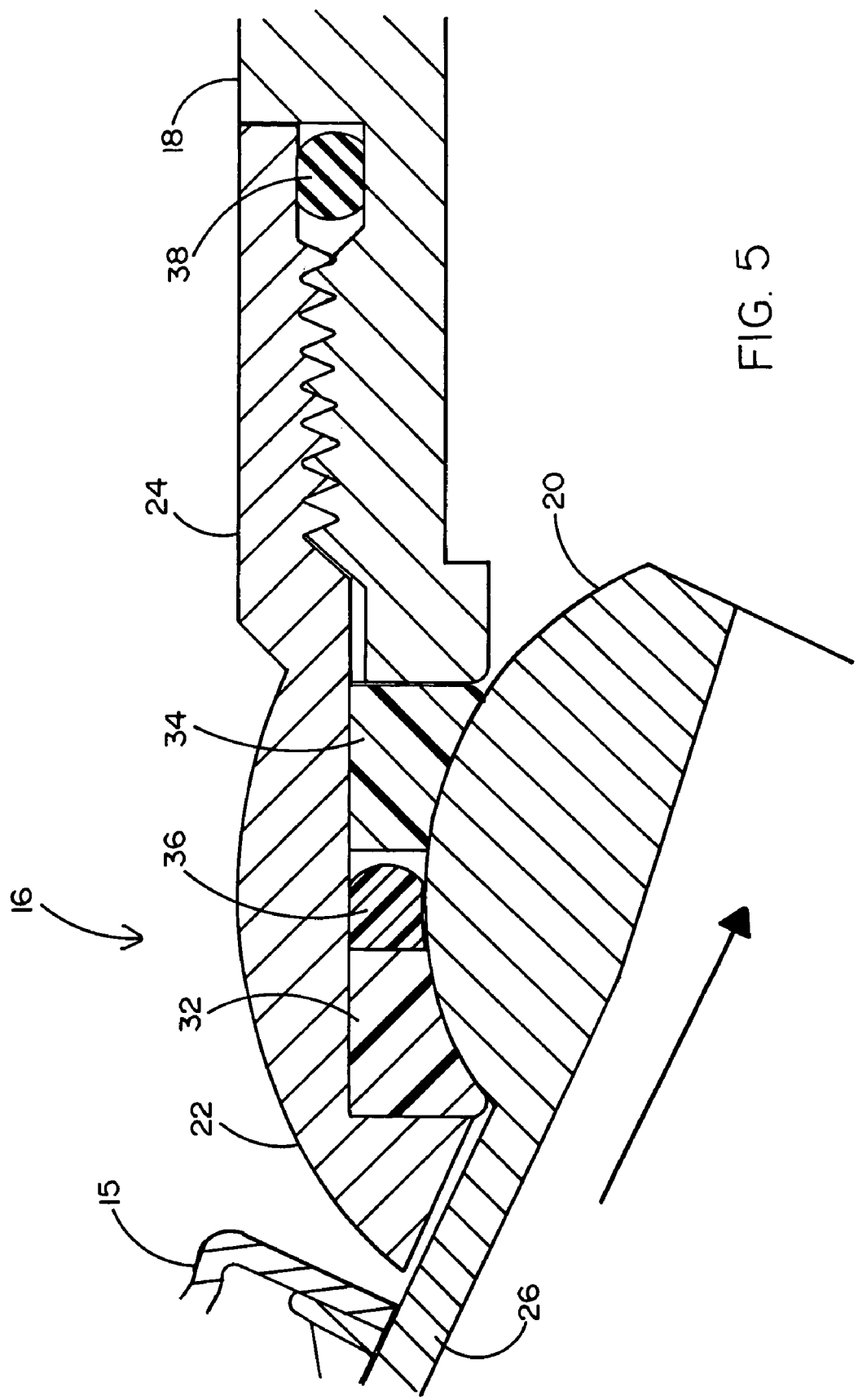
FIG. 5 is a view similar to FIG. 4, but shown under conditions of elevated system pressure.

The ball 20 is secured within socket 22 using a pair of bushings 32 and 34 on either side of a centered O-ring 36. The bushings are preferably made of a low friction material such as Teflon and the like. A lubricant is preferably placed between the O-ring 36 and the bushings 32 and 34 to further facilitate smooth swivel motion and to protect the surface of the ball 20. The tangent point of the swivel ball radius is positioned slightly higher than the two Teflon bushings. This creates a proper O-ring gland width and provides gaps 40 for containment of the aforementioned lubricant. The bushings 32 and 34 are machined or molded with the same radius as the swivel ball. Consequently, the bushings also function as seals and respond to system pressure to increase resistance to system pressure leakage by eliminating any clearance gaps between the ball and socket. As shown in FIG. 5, as the system pressure builds inside the swivel, the O-ring 36 and swivel ball are forced rearward. The close fit between the bushing and the swivel ball increases thereby assuring a zero clearance condition. No water or contamination can enter between the ball and the socket thus assuring a ball substantially free of debris which could otherwise cause corrosion and interfere with smooth swivel motion.

Having thus disclosed a preferred embodiment of the invention, it will now be evident that various modifications and additions may be readily perceived. By way of example, the specific materials recited herein are by way of illustration only and may be readily substituted by other equally appropriate materials. Accordingly, the scope hereof is to be limited only by the appended claims and their equivalents.

I claim:

1. A connection assembly comprising:
   an air pressure hose;
   a scuba second stage regulator;
   a ball and socket, the ball having a hollow stem connected to the hose, the socket having a threaded connector attached to the regulator;
   a pair of spaced apart bushings sealingly engaging the ball within the socket and forming an annular sealed gap between the bushings; and
   an O-ring surrounding the ball within the gap.

2. The assembly recited in claim 1 further comprising a lubricant filling said sealed gap.

3. The assembly recited in claim 1 wherein each of said bushings has a curved surface contacting said ball, the radius of each said curved surface being substantially equal to the radius of said ball.

4. The assembly recited in claim 1 further comprising a boot for extending over said hose adjacent said ball and socket, said boot having a wiper portion extending over said socket for wiping sand from said socket upon rotation of said ball.

5. A connection assembly comprising:
   an air pressure hose;
   a scuba second stage regulator;
   a ball and socket, the ball having a hollow stem connected to the hose, the socket having a threaded connector attached to the regulator;
   a boot for extending over said hose adjacent said ball and socket, said boot having a wiper portion extending over said socket for wiping sand from said socket upon rotation of the ball of said ball and socket.

6. The assembly recited in claim 5 further comprising:
   a pair of spaced apart bushings sealingly engaging the ball within the socket and forming an annular sealed gap between the bushings; and
   an O-ring surrounding the ball within said sealed gap.

7. The assembly recited in claim 6 further comprising a lubricant filling said gap.

8. The assembly recited in claim 6 wherein each of said bushings has a curved surface contacting said ball, the radius of each said curved surface being substantially equal to the radius of said ball.

\* \* \* \* \*